US011979929B2

United States Patent
Seok et al.

(10) Patent No.: US 11,979,929 B2
(45) Date of Patent: May 7, 2024

(54) SYSTEMS AND METHODS FOR MULTI-LINK OPERATION IN A WIRELESS NETWORK

(71) Applicant: MediaTek Singapore Pte. Ltd., Singapore (SG)

(72) Inventors: Yongho Seok, San Jose, CA (US); Weisung Tsao, San Jose, CA (US); James Chih-Shi Yee, San Jose, CA (US); Po-Yuen Cheng, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 105 days.

(21) Appl. No.: 16/888,448

(22) Filed: May 29, 2020

(65) Prior Publication Data

US 2020/0383156 A1 Dec. 3, 2020

Related U.S. Application Data

(60) Provisional application No. 62/856,255, filed on Jun. 3, 2019, provisional application No. 62/968,266, filed on Jan. 31, 2020.

(51) Int. Cl.
*H04W 76/15* (2018.01)
*H04W 74/0808* (2024.01)
*H04W 76/11* (2018.01)
*H04W 80/08* (2009.01)

(52) U.S. Cl.
CPC ....... *H04W 76/15* (2018.02); *H04W 74/0808* (2013.01); *H04W 76/11* (2018.02); *H04W 80/08* (2013.01)

(58) Field of Classification Search
CPC ..... H04W 76/15; H04W 76/11; H04W 76/10; H04W 74/0808; H04W 74/08; H04W 80/08; H04W 80/02; H04W 72/1252; H04W 72/082; H04W 72/08; H04W 84/10; H04W 84/12
See application file for complete search history.

(56) References Cited

U.S. PATENT DOCUMENTS

| 6,477,368 | B1 | 11/2002 | Korneluck et al. |
| 11,265,927 | B1 | 3/2022 | Chu et al. |
| 11,576,208 | B2 | 2/2023 | Seok et al. |

(Continued)

FOREIGN PATENT DOCUMENTS

| EP | 2329680 A1 | 6/2011 |
| GB | 2549967 A | 8/2017 |

(Continued)

OTHER PUBLICATIONS

Seok; et al. EHT Multi-Link Operation. doc.: IEEE 802.11-19/073r0. May 15, 2019. 17 pp.

*Primary Examiner* — Sudesh M Patidar

(57) ABSTRACT

Embodiments of the present invention provide methods for performing multi-link operations in a wireless network. The multi-link operations can include constrained multi-link operations configured to prevent or mitigate IDC interference, for example, by preventing or delaying access to a wireless medium while data is being transmitted or received on another wireless medium.

16 Claims, 10 Drawing Sheets

(56) References Cited

U.S. PATENT DOCUMENTS

| | | | |
|---|---|---|---|
| 2005/0089001 A1* | 4/2005 | Nishikawa | H04W 72/1242 370/338 |
| 2005/0170776 A1 | 8/2005 | Siorpaes | |
| 2008/0130622 A1* | 6/2008 | Hiertz | H04W 74/0816 370/348 |
| 2009/0103501 A1 | 4/2009 | Farrag et al. | |
| 2009/0225717 A1* | 9/2009 | Banerjea | H04W 72/0413 370/329 |
| 2010/0075600 A1 | 3/2010 | Haartsen | |
| 2012/0120892 A1* | 5/2012 | Freda | H04W 8/005 370/329 |
| 2012/0134342 A1 | 5/2012 | Le et al. | |
| 2013/0225068 A1* | 8/2013 | Kiminki | H04W 72/1215 455/39 |
| 2014/0233551 A1* | 8/2014 | Wentink | H04L 69/22 370/338 |
| 2014/0341100 A1 | 11/2014 | Sun et al. | |
| 2016/0164652 A1* | 6/2016 | Huang | H04L 5/0007 370/329 |
| 2016/0330714 A1 | 11/2016 | Hedayat | |
| 2016/0330757 A1* | 11/2016 | Cherian | H04W 72/1268 |
| 2016/0345202 A1 | 11/2016 | Bharadwaj et al. | |
| 2017/0171878 A1 | 6/2017 | Chun et al. | |
| 2017/0201975 A1 | 7/2017 | Yang et al. | |
| 2017/0264416 A1* | 9/2017 | Wilhelmsson | H04W 72/23 |
| 2018/0084582 A1 | 3/2018 | Liu et al. | |
| 2018/0199378 A1* | 7/2018 | Son | H04B 17/318 |
| 2018/0262984 A1* | 9/2018 | Huang | H04B 7/0452 |
| 2018/0310330 A1 | 10/2018 | Chun et al. | |
| 2019/0052428 A1 | 2/2019 | Chu et al. | |
| 2019/0195996 A1 | 6/2019 | Ding | |
| 2019/0297674 A1* | 9/2019 | Min | H04L 5/0098 |
| 2019/0306920 A1 | 10/2019 | Son et al. | |
| 2020/0214036 A1 | 7/2020 | Min et al. | |
| 2020/0288523 A1* | 9/2020 | Patil | H04W 76/15 |
| 2020/0383156 A1 | 12/2020 | Seok et al. | |
| 2021/0136819 A1 | 5/2021 | Seok et al. | |
| 2021/0368491 A1 | 11/2021 | Song et al. | |

FOREIGN PATENT DOCUMENTS

| | | | |
|---|---|---|---|
| WO | 2006096864 A2 | 9/2006 | |
| WO | WO-2006096864 A2 * | 9/2006 | H01Q 1/007 |

\* cited by examiner

SYSTEMS AND METHODS FOR MULTI-LINK OPERATION IN A WIRELESS NETWORK

CROSS-REFERENCE TO RELATED APPLICATIONS

This application claims the benefit of and priority to provisional patent application Ser. No. 62/856,255, with filing date Jun. 3, 2019 by Yongho Seok, et al., and to provisional patent application Ser. No. 62/968,266, filed Jan. 31, 2020 by Yongho Seok, et al., both of which are hereby incorporated by reference in their entirety.

FIELD

Embodiments of the present invention generally relate to the field of wireless communications. More specifically, embodiments of the present invention relate to systems and methods for multi-link operation within a wireless communication network.

BACKGROUND

Modern electronic devices typically send and receive data with other electronic devices wirelessly using Wi-Fi, and many of these devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

However, in some cases, the use of a single band may not satisfy the bandwidth needs of certain devices. Therefore, some developing approaches to wireless communication increase communication bandwidth by operating on multiple bands concurrently (technically called link aggregation or multi-link operation).

When a wireless device sends and receives data simultaneously in a multi-link operation, in-device coexistence (IDC) interference can cause substantial performance loss between the multiple wireless links. The IDC interference caused by simultaneous transmission and reception over a 2.4 GHz band and 5 GHz band is typically negligible. However, the IDC interference caused by simultaneous transmission and reception over a 5 GHz band and 6 GHz band can substantially impact performance and lead to frequent packet loss.

SUMMARY

Accordingly, what is need is an approach to constrained multi-link operations that increases throughput of the wireless network while advantageously preventing or mitigating the IDC interference caused by simultaneous transmission and reception of data over multiple wireless bands. Embodiments of the present invention provide systems and methods for accessing multiple wireless links (e.g., wireless channels, wireless bands, wireless mediums, etc.) simultaneously during a transmission opportunity (TXOP) granted to a wireless STA to increase throughput of the wireless network while advantageously preventing or mitigating any IDC interference caused by simultaneous transmission and reception of data over multiple wireless bands.

According to one embodiment, a method of wireless multi-link operation is disclosed. The method includes accessing a first wireless medium to receive data, receiving the data in a physical layer conformance procedure (PLCP) protocol data unit (PPDU) on the first wireless medium, and delaying access to a second wireless medium while receiving the PPDU on the first wireless medium.

According to some embodiments, the delaying access of the second wireless medium comprises preventing transmission of data on the second wireless medium.

According to some embodiments, the first wireless medium is a 5 GHz wireless link and the second wireless medium is a 6 GHz wireless link.

According to some embodiments, the method includes receiving a request to send (RTS) frame, and transmitting a clear to send (CTS) frame responsive to the RTS frame, wherein the delaying access to a second wireless medium is performed responsive to the RTS frame.

According to some embodiments, the RTS frame comprises a Multi User (MU)-RTS frame.

According to some embodiments, the method includes transmitting a block acknowledgement (BA) after the PPDU is received.

According to some embodiments, the method includes accessing the second wireless medium to transmit a different PPDU.

According to some embodiments, the method includes receiving an indication that the PPDU comprises a final frame transmitted during a transmission opportunity (TXOP), wherein the accessing the second wireless medium to transmit the different PPDU is performed responsive to the indication.

According to some embodiments, the method includes determining that the PPDU is scheduled to be received on the first wireless medium, wherein the delaying access to a second wireless medium while receiving the PPDU on the first wireless medium is performed responsive to the determining.

According to some embodiments, the method includes accessing a first wireless medium to transmit data, transmitting the data in a physical layer conformance procedure (PLCP) protocol data unit (PPDU) on the first wireless medium, and delaying access to a second wireless medium for receiving data on the second wireless medium.

According to some embodiments, the PPDU solicits an immediate response, and wherein the delaying access of the second wireless medium comprises preventing transmission of data on the second wireless medium until the immediate response has been received.

According to some embodiments, the method includes determining an in-device coexistence (IDC) interference level of a multi-link operation, wherein the delaying access of the second wireless medium is performed responsive to the IDC level being above a threshold.

According to some embodiments, the first wireless medium is a 5 GHz wireless link and the second wireless medium is a 6 GHz wireless link.

According to another embodiment, a method of wireless multi-link operation is disclosed. The method includes obtaining a transmission opportunity on a first wireless medium, determining that a peer wireless station (STA) is configured to perform a constrained multi-link operation using the first wireless medium, and delaying access to the first wireless medium for transmitting data to the peer wireless STA on the first wireless medium.

According to some embodiments, the method includes comprising determining that the peer wireless STA is accessing a second wireless medium to transmit data.

According to some embodiments, the method includes determining that the peer wireless STA is accessing a second wireless medium to transmit a physical layer conformance procedure (PLCP) protocol data unit (PPDU), and wherein the delaying access to the first wireless medium is performed responsive to content of the PPDU.

According to some embodiments, the method includes receiving a physical layer conformance procedure (PLCP) protocol data unit (PPDU) on a second wireless medium; and determining that the PPDU comprises an intra-Basic Service Set (BSS) PPDU, wherein the delaying access to the first wireless medium is performed responsive to the determining that the PPDU comprises the intra-BSS PPDU.

According to some embodiments, the first wireless medium is a 5 GHz wireless link, the peer wireless STA is further configured to perform the constrained multi-link operation using a second wireless medium, and the second wireless medium is a 6 GHz wireless link.

According to some embodiments, the method includes receiving an inter-Basic Service Set (BSS) physical layer conformance procedure (PLCP) protocol data unit (PPDU) on a second wireless medium; and transmitting data to the peer wireless STA on the first wireless medium responsive to content of the inter-BSS PPDU.

According to some embodiments, the method includes receiving a physical layer conformance procedure (PLCP) protocol data unit (PPDU) on a second wireless medium, determining that the PPDU originates from a second peer wireless STA, where the second peer wireless STA is different than the peer wireless STA, and transmitting data to the peer wireless STA on the first wireless medium responsive to determining that the PPDU originates from the second peer wireless STA.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
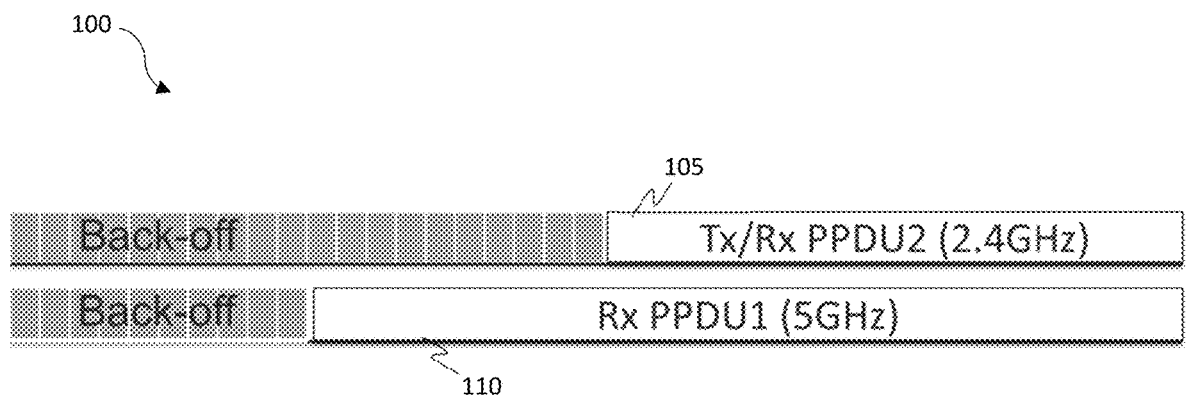
FIG. 1 is a transmission timing diagram of an exemplary multi-link operation between wireless devices.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 7-9) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," "preventing," "delaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Constrained Multi-Link Channel Access for Multi-Link Operation in a Wireless Network As used herein, the term "EHT" may refer generally to a recent generation of wireless communication technology (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments of the present invention provide systems and methods for accessing multiple wireless links (e.g., wireless channels, wireless bands, wireless mediums, etc.) simultaneously during a transmission opportunity (TXOP) granted to a wireless STA. When the wireless STA obtains TXOPs in multiple links, the wireless STA can simultaneously transmit frames on the multiple links to increase throughput, for example. Moreover, as depicted in transmission timing diagram 100 of FIG. 1, the wireless STA can receive a frame 105 on one link (e.g., a 5 GHz link) while the wireless STA is also transmitting frame 110 on another link (e.g., a 2.4 GHz or 6 GHz link). However, the wireless STA sending and receiving data simultaneously in a multi-link operation can cause in-device coexistence (IDC) interference. The IDC interference caused by simultaneous transmission and reception over a 2.4 GHz band and 5 GHz band is typically negligible. However, the IDC interference caused by simultaneously transmission and reception over a 5 GHz band and 6 GHz band can be substantial and can vary depending on the frequency separation of the operating channels. Accordingly, embodiments of the present invention provide systems and methods for performing constrained multi-link operations that increase throughput of the wireless network while advantageously preventing or mitigating the IDC interference caused by simultaneous transmission and reception of data over multiple wireless bands.

Figure 2:
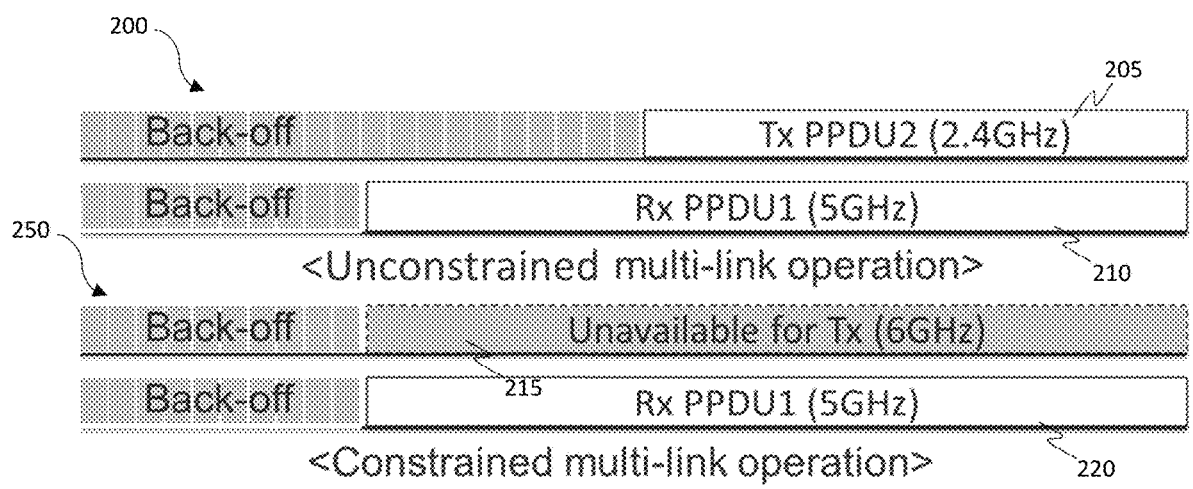
FIG. 2 is a transmission timing diagram of exemplary multi-link operations over an unconstrained wireless link and a constrained wireless link according to embodiments of the present invention.

With regard to FIG. 2, transmission and timing diagram 200 depicts an exemplary non-constrained multi-link operation, while transmission and timing diagram 250 depicts an exemplary constrained multi-link operation. The multi-link operation of transmission timing diagram 200 can be considered unconstrained because there is no significant IDC interference between the 2.4 GHz link and the 5 GHz link during the simultaneous transmission 205 and reception 210 of data. The multi-link operation of transmission timing diagram 250 can be considered constrained because there is significant IDC interference between the 5 GHz band and the 6 GHz band during the simultaneous transmission and reception of data. Therefore, the wireless STA should not access the 6 GHz link for transmission while it is already receiving frames on the 5 GHz link due to the constraint on simultaneous transmission and reception over these links. Specifically, as depicted in FIG. 2, the 6 GHz link is unavailable at time 215 during the reception 220 over the 5 GHz link.

When the wireless STA has a constraint on simultaneous transmission and reception over a first link and a second link, in some cases the wireless STA can determine that the second link will be unavailable for a transmission while it is receiving a physical layer conformance procedure (PLCP) protocol data unit (PPDU). Generally, the second wireless link will be unavailable to the wireless STA for transmission (e.g., the wireless STA will be prevented or delayed from accessing the second wireless link) when the received PPDU is potentially addressed to the wireless STA (an "intra-BSS" PPDU). When the wireless STA is unable to determine if the PPDU is an intra-Basic Service Set (BSS) or an inter-BSS PPDU, and the wireless link will be considered unavailable because the PPDU must be decoded to determine if it is addressed to the wireless STA. The wireless STA can determine that the PPDU is an intra-BSS PDDU when the PPDU meets one of the following conditions in Table 1:

TABLE I

1. The RXVECTOR parameter BSS_COLOR of the PPDU carrying the frame is the BSS color of the BSS to which the wireless STA belongs, or the BSS color of any Tunneled Direct Link Setup (TDLS) links to which the wireless STA belongs if the wireless STA is an HE/EHT wireless STA associated with a non-HE AP;
2. The PPDU is a very high throughput (VHT) PPDU with RXVECTOR parameter PARTIAL_AID equal to the BSSID of the BSS to which the wireless STA is associated or any of the other BSSs in the same multiple BSSID set or co-hosted BSSID set to of its BSS, and the RXVECTOR parameter GROUP_ID is equal to 0;
3. The PPDU is a VHT PPDU with the RXVECTOR parameter PARTIAL_AID equal to the 4 least significant bits (LSBs) of the BSS color announced by of the BSS of the wireless STA having dot11PartialBSSColorImplemented equal to "true", the RXVECTOR parameter GROUP_ID is equal to 63, and the Partial BSS Color field in the most recent High Efficiency (HE) Operation element is 1;
4. The PPDU carries a frame that has an receiver address (RA), transmitter address (TA) or BSSID field value that is equal to the BSSID of the BSS or the BSSID of any BSS with which the wireless STA is associated or any of the other BSSs in the same multiple BSSID set or co-hosted BSSID set to which its BSS belongs. The Individual/Group bit in the TA field value is forced to the value 0 prior to the comparison; or
5. The PPDU carries a Control frame that does not have a TA field and that has an RA field value that matches the saved TXOP holder address of the BSS or any BSS to which the wireless STA is associated, or any of the other BSSs in the same multiple BSSID set or co-hosted BSSID set to which its BSS belongs.

Moreover, the wireless STA can determine that the second link is/will be available for a transmission while it is receiving an inter-BSS PPDU on the first link that meets one of following conditions in Table 2:

TABLE 2

1. The RXVECTOR parameter BSS_COLOR is not 0 and is not the BSS color of the BSS of which the wireless STA is a member;
2. The PPDU is a VHT PPDU with RXVECTOR parameter PARTIAL_AID not equal to the BSSID of the BSS with which the wireless STA is associated or any of the other BSSs in the same multiple BSSID set or co-hosted BSSID set to which its BSS belongs and the RXVECTOR parameter GROUP_ID is 0;
3. The PPDU is a VHT PPDU with RXVECTOR parameter PARTIAL_AID not equal to the 4 LSBs of the BSS color announced by the BSS of which the wireless STA whose dot11PartialBSSColorImplemented is equal to "true" is a member and RXVECTOR parameter GROUP_ID equal to 63 when the Partial BSS Color field in the most recent HE Operation element is 1;
4. The PPDU is either a VHT multi-user (MU) PPDU or an HE MU PPDU with the RXVECTOR parameter UPLINK_FLAG equal to 0 and the wireless STA is an AP;
5. The PPDU carries a frame that has a BSSID field, the value of which is not the BSSID of the BSS with which the wireless STA is associated or any of the other BSSs in the same multiple BSSID set or cohosted BSSID set to which its BSS belongs or the wildcard BSSID; or
6. The PPDU carries a frame that does not have a BSSID field but has both an receiver address (RA) field and transmitter address (TA) field, neither value of which is equal to the BSSID of the BSS with which the wireless STA is associated or any of the other BSSs in the same multiple BSSID set or co-hosted BSSID set to which its BSS belongs. The Individual/Group bit in the TA field value is forced to 0 prior to comparison.

It should be appreciated that the wireless STA can determine that the second link is available for a transmission anytime that it is not receiving a PPDU.

Figure 3:
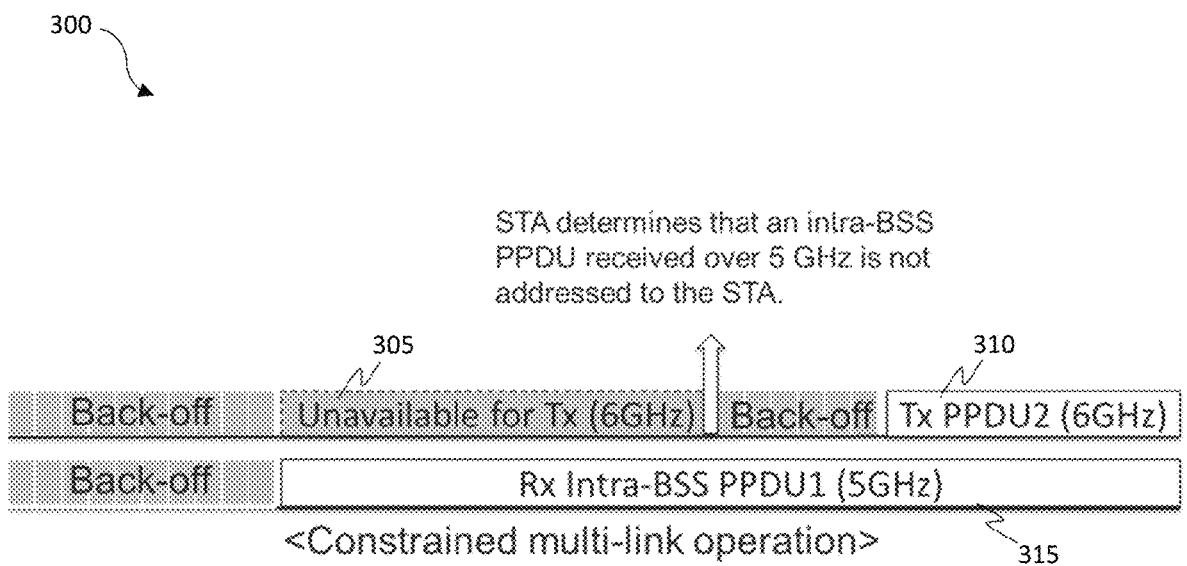
FIG. 3 is a transmission timing diagram of exemplary multi-link operations over a constrained wireless link including determining if an intra-BSS is addressed to an STA according to embodiments of the present invention.

With regard to FIG. 3, an exemplary transmission and timing diagram 300 depicting an exemplary simultaneous reception and transmission performed by a wireless STA over multiple links in a multi-link operation is depicted according to embodiments of the present invention. When the wireless STA is receiving data 315 on the 5 GHz wireless link in an intra-BSS PPDU, or a PPDU that cannot be determined to be an intra-BSS, the wireless STA does not need to decode the remaining PPDU when the wireless STA determines that the receiving PPDU is not addressed to the wireless STA. For example, the wireless STA can determine that the PPDU is not addressed to the wireless STA by decoding a medium access control (MAC) header of the PPDU 315 and determining a MAC address destination of the PPDU 315. The wireless STA can then access the 6 GHz wireless link for transmission 310. The 6 GHz wireless link is unavailable at time 305 (before the wireless STA determines that the PPDU is not addressed to that STA).

According to some embodiments, when the wireless STA has a constraint on simultaneous transmission and reception on a first link and a second link, the wireless STA determines if the second link is available for a transmission while it is receiving a PPDU on the first link that meets one of the following conditions (or while it is not presently receiving a PPDU) in Table 3:

TABLE 3

1. The wireless STA is a non-AP STA and the PPDU is an HE MU PPDU having a RXVECTOR parameter UPLINK_FLAG equal to 0 and an RXVECTOR parameter STA_ID_LIST that does not include the identifier of the wireless STA or the broadcast identifier(s) intended for the wireless STA;
2. The wireless STA is a non-AP STA and the PPDU is an HE MU PPDU, HE SU PPDU or HE ER SU PPDU having an RXVECTOR parameter UPLINK_FLAG equal to 1;
3. The wireless STA is a non-AP STA and the PPDU is an HE TB PPDU.
4. The wireless STA is an AP STA and the PPDU is either an HE MU PPDU with the RXVECTOR parameter UPLINK_FLAG set to 0 or a VHT MU PPDU;
5. The wireless STA is an AP STA and the PPDU is VHT PPDU and the RXVECTOR parameter GROUP_ID is 0 and the RXVECTOR parameter PARTIAL_AID is not the BSSID of the BSS with which the wireless STA is associated;
6. The PPDU contains at least one MAC Protocol Data Unit (MPDU) of which the RA is not the individual MAC address of the wireless STA or the group address(es) of the wireless STA; or
7. The PPDU is an inter-BSS PPDU that meets one of the conditions in Table 2. Depending on the implementation, if the wireless STA needs to update the NAV on the first link, this condition is amended as the following: The PPDU is an inter-BSS PPDU that meets one of the conditions shown in Table 2 and the valid NAV information is obtained from the PPDU or the spatial reuse condition is met from the PPDU.
If none of the conditions of Table 3 are met, the wireless STA determines that the second link is not available for a transmission.

Figure 4:
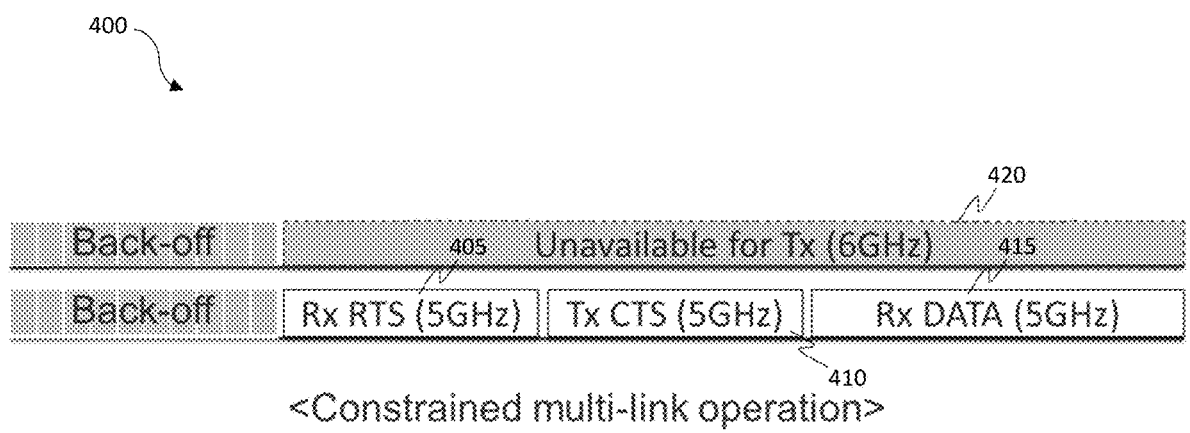
FIG. 4 is a transmission timing diagram of exemplary multi-link operations over a constrained wireless link based on an RTS/CTS frame exchange sequence according to embodiments of the present invention.

With regard to FIG. 4, an exemplary transmission and timing diagram 400 depicting a simultaneous reception and transmission performed by a wireless STA using a request to send (RTS)/clear to send (CTS) frame exchange over multiple links in a multi-link operation is depicted according to embodiments of the present invention. The wireless STA receives a PPDU on the 5 GHz link and can predict a subsequent reception of a PPDU 415 on the first link based on the RTS 405/CTS 410 frame exchange, and the 6 GHz wireless link is considered unavailable for transmission at time 420. The wireless STA can determine that the second link is not available for a transmission at time 420 during the TXOP duration based on an RTS (or MU-RTS or Null Data Packet Announcement (NDPA)) frame received on the first link if the PPDU meets one of the following conditions in Table 4:

TABLE 4

1. The RTS frame received on the first link has an RA field equal to the MAC address of STA;
2. The wireless STA received on the first link the MU-RTS frame having the AID12 subfield of the User Info field is equal to the 12 LSBs of the AID of the wireless STA; or
3. The wireless STA received on the first link the NDPA frame having the AID11 subfield of the wireless STA Info field is equal to the 11 LSBs of the AID of the wireless STA.

According to some embodiments, an STA of a multi-link device that obtains a TXOP sends a frame to a peer STA of a constrained multi-link device (MLD), the wireless STA should initiate the RTS/MU-RTS and CTS frame exchange with the peer STA. In this case, when an STA of a constrained MLD receives the RTS/MU-RTS frame addressed to itself, other STAs within the constrained MLD should not access a channel during the time indicated by the duration information in the received RTS/MU-RTS frame. Before the time indicated in the duration information expires, other STAs in the constrained MLD can resume the medium access if the wireless STA determines that no additional frames will be sent to itself. For example, a frame having the End of Service Period (EOSP) subfield set to a value of 1 indicates that this frame is intended to be the last (final) frame transmitted to the wireless STA within the same TXOP. The peer STA may not respond with the CTS frame even though the NAV is idle, if the constrained MLD determines that the frame exchange with the STA is not available.

The wireless STA can also determine that the second link is available for a transmission during the remaining TXOP duration if it determines that the TXOP holder will not transmit any more frames to the wireless STA on the first link. The TXOP holder can indicate whether it is intended to be the last (final) frame transmitted to the wireless STA on the link within the same TXOP. For example, the EOSP subfield of the QoS Control field of the QoS Data/Null frame transmitted on the first link can be set to a value of 1 to indicate that it is intended to be the last frame transmitted to the wireless STA on a link (e.g., a 5 GHz or 6 GHz wireless link) within the same TXOP.

When the wireless STA transmitted on the first link a frame that solicits an immediate response, the wireless STA should determine that the second link is not available for a transmission during the reception of the solicited response on the first link. The wireless STA can determine that the second link is not available for a transmission during the scheduled reception time on the first link, independent of the first link's status. The scheduled reception time includes Target Beacon Transmission Time (TBTT) and Target Wake Time (TWT) Service Period.

When an STA of a constrained MLD receives the RTS/MU-RTS frame addressed to itself, other STAs within the constrained MLD should not access a channel during the time indicated by the Duration information in the received RTS/MU-RTS frame. Before the time indicated in the duration information expires, if the wireless STA determines that no additional frames will be sent to itself, other STAs in the constrained MLD can resume the medium access. For example, a frame having an EOSP subfield set to a value of 1 indicates that this is intended to be the last frame transmitted to the wireless STA within the same TXOP.

Figure 5:
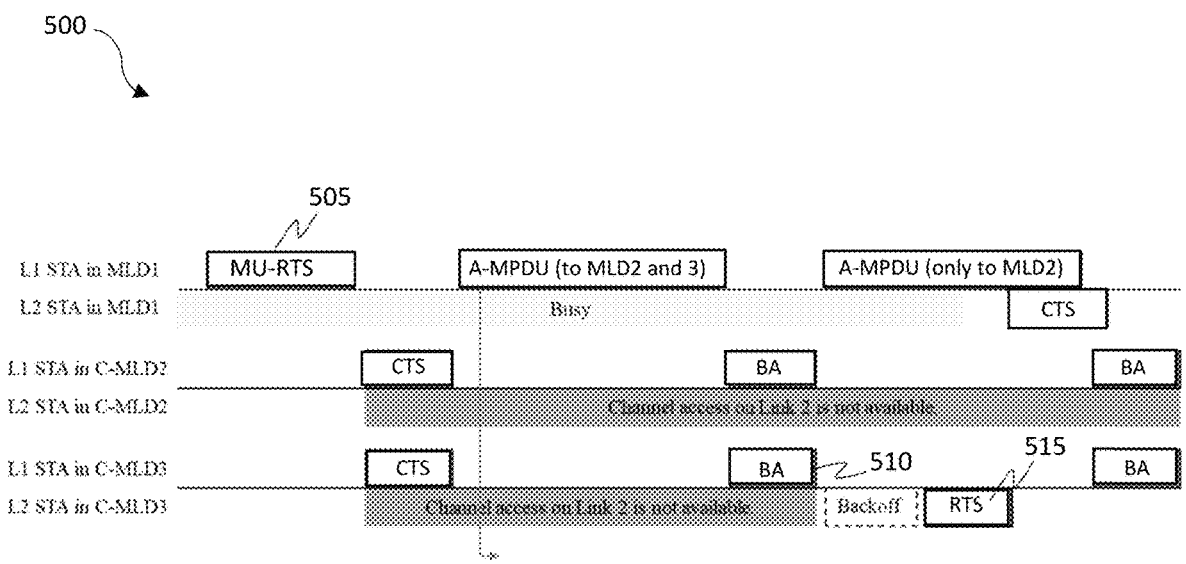
FIG. 5 is a transmission timing diagram of exemplary multi-link operations performed over a constrained wireless link based on an MU-RTS frame exchange sequence indicating a last (final) frame of a transmission according to embodiments of the present invention.

With regard to FIG. 5, an exemplary transmission timing diagram 500 of a multi-link operation for a constrained MLD is depicted according to embodiments of the present invention. In the example depicted in FIG. 5, the TXOP responder is a constrained MLD. MU-RTS frame 505 sent on Link 1 prevents channel access on Link 2 from the MLDs (C-MLD2 and C-MLD3) addressed by the MU-RTS frame 505. A per-PPDU determination for the channel access availability on each link is not necessary. Rather, when the MLD1 indicates that there are no additional frames addressed to C-MLD3, C-MLD3 can resume channel access on Link 2 after BA 510 is transmitted, for example, by transmitting RTS frame 515.

Figure 6:
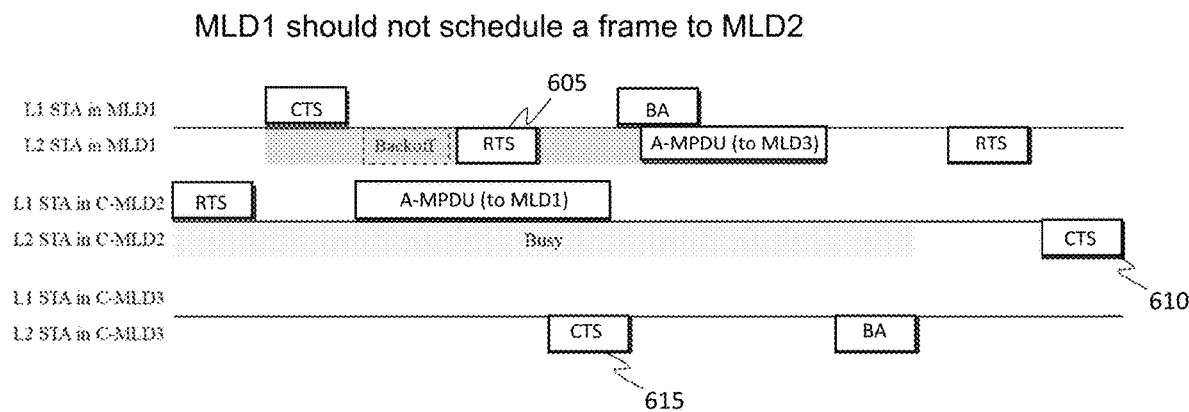
FIG. 6 is a transmission timing diagram of exemplary multi-link operations of a TXOP holder over a constrained wireless link based on an MU-RTS frame exchange and a duration field thereof according to embodiments of the present invention.

With regard to FIG. 6, an exemplary transmission timing diagram 600 of a multi-link operation for a constrained MLD is depicted according to embodiments of the present invention. While an STA within a constrained MLD (TXOP holder) is transmitting, other STAs within the constrained MLD are at risk of losing Network Allocation Vector (NAV) synchronization when NAV update information is not received successfully due to IDC interference. Starting a TXOP period with an RTS/MU-RTS and CTS frame exchange sequence advantageously reduces the potential collision overhead caused by IDC.

As depicted in FIG. 6, the TXOP holder is a constrained MLD. When an STA within the constrained MLD that obtains the TXOP sends a frame to a peer STA within another MLD, the wireless STA initiates an RTS/MU-RTS and CTS frame exchange sequence with the peer STA. When an STA within a MLD receives the RTS/MU-RTS frame from a peer STA within a constrained MLD, other STAs in the MLD should not send a frame to any STA within the constrained MLD during the time indicated by the duration field in the received RTS/MU-RTS frame. As depicted in FIG. 6, the RTS frame sent on the Link 1 from the C-MLD2 prevents the MLD1 from obtaining a TXOP on Link 2 and schedules a frame to be transmitted to MLD2 at the time indicated by the Duration field in the received RTS frame. MLD1 transmits RTS frame 605, and the constrained MLD C-MLD3 responds with CTS frame 615. Link 2 of the constrained MLD C-MLD2 is busy while C-MLD2 is transmitting A-MPDU 615. Constrained MLD C-MLD2 transmits a CTS frame 610 when Link 2 of C-MLD2 is available.

Constrained Multi-Link Packet Scheduling for Multi-Link Operation in a Wireless Network After obtaining a TXOP on a second link, if a peer STA having a constraint on simultaneous transmission and reception on a first link and second link is accessing the first link, the wireless STA should not transmit frames on the second link to the peer STA. Embodiments of the present invention provide devices and methods for sending downlink data from an AP TXOP holder to constrained device having a constraint on simultaneous transmission and reception.

According to some embodiments, a wireless STA can be prevented from accessing a wireless medium to transmit data to a peer wireless STA when the peer wireless STA is already transmitting data, or may be transmitting data, or is scheduled to transmit data in the immediate future. According to some embodiments, access to a wireless medium for performing a multi-link operation can be prevented responsive to an IDC level being above a threshold. The IDC level can be measured by the wireless STA, and the access can be automatically prevented. According to some embodiments, the IDC level is determined according to a frequency separation of the wireless mediums used for multi-link operation.

An STA that obtains a TXOP on a second link can determine if the constrained peer STA (having a constraint on simultaneous transmission and reception on the first link and second link) is receiving an intra-BSS PPDU on a first link, and the wireless STA prevents transmission of frames on the second wireless link to that peer STA in order to avoid IDC interference. The wireless STA should not transmit data to the constrained peer STA over the second wireless link if the PPDU cannot be determined to be an intra-BSS PPDU or an inter-BSS PPDUS, or the PPDU meets one of following conditions in Table 5:

TABLE 5

1. The RXVECTOR parameter BSS_COLOR of the PPDU carrying the frame is the BSS color of the BSS of which the wireless STA is a member, or the BSS color of any TDLS links to which the wireless STA belongs if the wireless STA is an HE WIRELESS STA associated with a non-HE AP;
2. The PPDU is a VHT PPDU with RXVECTOR parameter PARTIAL_AID equal to the BSSID of the BSS with which the wireless STA is associated or any of the other BSSs in the same multiple BSSID set or co-hosted BSSID set to which its BSS belongs and the RXVECTOR parameter GROUP_ID is equal to a value of 0;
3. The PPDU is a VHT PPDU with RXVECTOR parameter PARTIAL_AID equal to the 4 LSBs of the BSS color announced by of the BSS of which the wireless STA whose dot11PartialBSSColorImplemented is equal to "true" is a member, the RXVECTOR parameter GROUP_ID is equal to 63, and the Partial BSS Color field in the most recent HE Operation element is 1;
4. The PPDU carries a frame that has an RA, TA or BSSID field value that is equal to the BSSID of the BSS or the BSSID of any BSS with which the wireless STA is associated, or any of the other BSSs in the same multiple BSSID set or co-hosted BSSID set to which its BSS belongs. The Individual/Group bit in the TA field value is forced to a value of 0 prior to the comparison; or
5. The PPDU carries a Control frame that does not have a TA field and that has an RA field value that matches the saved TXOP holder address of the BSS or any BSS with which the wireless STA is associated or any of the other BSSs in the same multiple BSSID set or co-hosted BSSID set to which its BSS belongs.

An STA that obtains a TXOP on a second link should not consider whether or not the peer STA (having a constraint on simultaneous transmission and reception on the first link and second link) is using a first link whenever the STA is not receiving a PPDU, or whenever the STA is receiving an inter-BSS PPDU on the first link that meets one of the following conditions in Table 6:

TABLE 6

1. The RXVECTOR parameter BSS_COLOR is not 0 and is not the BSS color of the BSS of which the wireless STA is a member;
2. The PPDU is a VHT PPDU with RXVECTOR parameter PARTIAL_AID not equal to the BSSID of the BSS with which the wireless STA is associated or any of the other BSSs in the same multiple BSSID set or co-hosted BSSID set to which its BSS belongs and the RXVECTOR parameter GROUP_ID is 0;
3. The PPDU is a VHT PPDU with an RXVECTOR parameter PARTIAL_AID not equal to the 4 LSBs of the BSS color announced by the BSS of which the wireless STA whose dot11PartialBSSColorImplemented is equal to true is a member and RXVECTOR parameter GROUP_ID equal to 63 when the Partial BSS Color field in the most recent HE Operation element is 1;
4. The PPDU is either a VHT MU PPDU or an HE MU PPDU with the RXVECTOR parameter UPLINK_FLAG equal to 0 and the wireless STA is an AP;
5. The PPDU carries a frame that has a BSSID field, the value of which is not the BSSID of the BSS with which the wireless STA is associated or any of the other BSSs in the same multiple BSSID set or cohosted BSSID set to which its BSS belongs or the wildcard BSSID; or
6. The PPDU carries a frame that does not have a BSSID field but has both an RA field and TA field, neither value of which is equal to the BSSID of the BSS with which the wireless STA is associated or any of the other BSSs in the same multiple BSSID set or co-hosted BSSID set to which its BSS belongs. The Individual/Group bit in the TA field value is forced to a value of 0 prior to comparison.

When the wireless STA is not receiving any PPDU, or is receiving an inter-BSS PPDU on the first link that meets one of the conditions in Table 6, the wireless STA that obtains the TXOP on a second link can transmit frames on the second link to the constrained peer STA.

In some cases, even though the wireless STA is receiving an intra-BSS PPDU or a PPDU that can't be determined as an intra-BSS or inter-BSS PPDU on the first link, if the wireless STA knows that the PPDU it is receiving does not originate from the peer STA, the wireless STA can transmit frames on the second link to that peer STA.

According to some embodiments, when a peer STA that has a constraint on simultaneous transmission and reception on the first link and second link, an STA that obtains a TXOP on the second link should consider that the peer STA is already using the first link to transmit data. The wireless STA can determine that the peer STA is using the first link based on the PPDU being received by the wireless STA on the first link. The wireless STA should not transmit frames on the second link to the constrained peer STA while it is receiving a PPDU on the first link that meets one of the following conditions in Table 7:

TABLE 7

1. The peer STA is the AP to which it is associated and the PPDU is one of the following:
An HE TB PPDU, where the RXVECTOR parameter
BSS_COLOR is the BSS color of the BSS with which the wireless
STA is associated;
An HE MU PPDU, HE SU PPDU or HE ER SU PPDU, where the
RXVECTOR parameter BSS_COLOR is the BSS color of the BSS
with which the wireless STA is associated, the RXVECTOR
parameter UPLINK_FLAG is 1; or
An VHT PPDU, where the RXVECTOR parameter
PARTIAL_AID is the BSSID of the BSS with which the wireless
STA is associated and the RXVECTOR parameter GROUP_ID is 0.
2. The peer STA is the non-AP STA of the BSS associated with the wireless
STA, and the PPDU is an HE MU PPDU, where the RXVECTOR parameter
BSS_COLOR is the BSS color of the BSS with which the wireless STA is associated, the
RXVECTOR parameter STA_ID_LIST includes the identifier of the peer STA or the
broadcast identifier(s) intended for the wireless STA; or
3. The PPDU contains at least one MPDU of which the RA or the TA is the
individual MAC address of the peer STA or the group address(es) of the peer STA.

Figure 7:
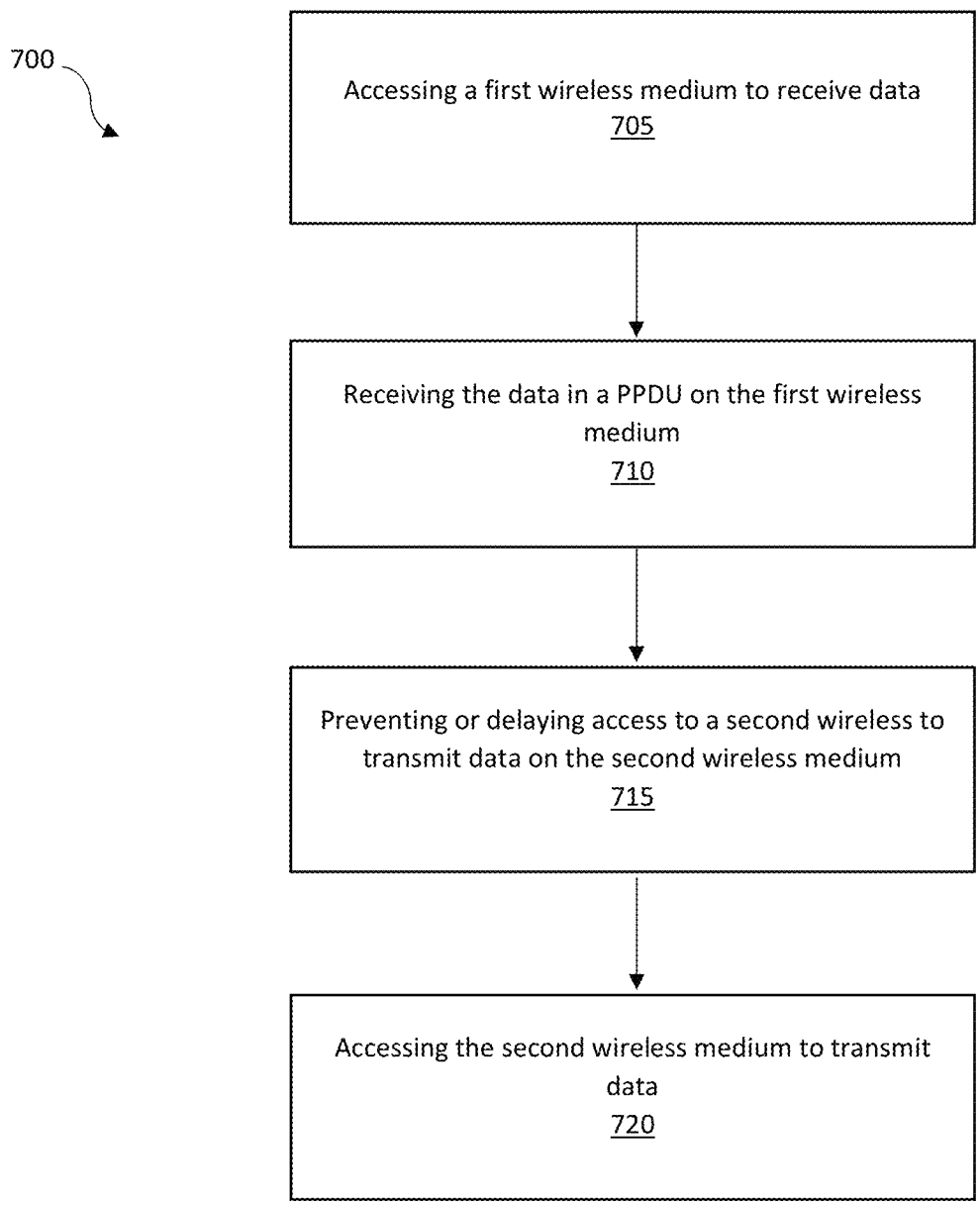
FIG. 7 is a flow chart depicting an exemplary sequence of computer implemented steps of an automatic process performed by a wireless STA for multi-link channel access with a constrained multi-link device according to embodiments of the present invention.

FIG. 7 is a flow chart depicting an exemplary sequence of computer implemented steps of a process 700 performed by a constrained multi-link device for multi-link channel access with a according to embodiments of the present invention.

At step 705, a first wireless medium is accessed to receive data.

At step 710, data is received in a PPDU on the first wireless medium.

At step 715, access to a second wireless medium is prevented or delayed while the constrained multi-link device 1 receives the PPDU on the first wireless medium. At this the second wireless medium is considered unavailable to the constrained multi-link device unless certain pre-defined conditions are met.

According to some embodiments, at step 715, access is prevented to the second wireless medium responsive to an RTS frame received by the wireless STA, or content of a PPDU received by the wireless STA, or conditions such as those listed in Tables 1-7 above.

In one example, at step 715, an RTS frame can be received on a 5 GHz wireless link of the constrained multi-link device indicating that data will be transmitted to the constrained multi-link device on the 5 GHz wireless link. Because the constrained multi-link device knows that it will be receiving data on the 5 GHz wireless link, access to a 6 GHz wireless link of the constrained multi-link device for transmitting data is prevented or delayed until the data has been received on the 5 GHz wireless, for example, to mitigate IDC interference.

Step 720 can optionally be performed to access the second wireless medium to transmit data (e.g., a PPDU). For example, a PPDU can be transmitted when the second wireless medium becomes available.

Figure 8:
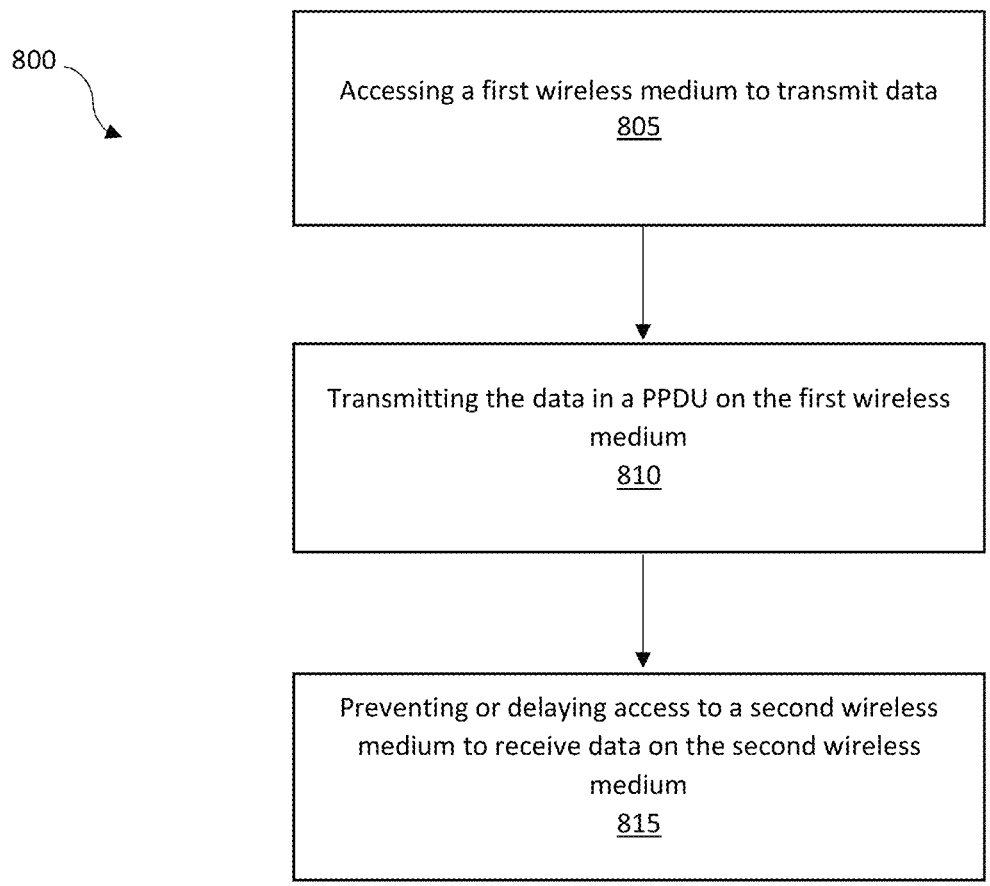
FIG. 8 is a flow chart depicting an exemplary sequence of computer implemented steps of an automatic process for performing multi-link operations with a constrained multi-link device while transmitting data according to embodiments of the present invention.

FIG. 8 is a flow chart depicting an exemplary sequence of computer implemented steps of a process 800 for performing multi-link operations using a constrained multi-link device while transmitting data according to embodiments of the present invention.

At step 805, a first wireless medium is accessed to transmit data.

At step 810, data is transmitted in a PPDU on the first wireless medium.

At step 815, access to a second wireless medium is prevented while transmitting the PPDU on the first wireless medium. At this the second wireless medium is considered unavailable to the constrained multi-link device unless certain pre-defined conditions are met.

According to some embodiments, at step 815, access of the second wireless medium is prevented responsive to content of the PPDU, or conditions such as those listed in Tables 1-7 above.

In one example, at step 815, the constrained multilink device has transmitted a frame on a 5 GHz wireless link that solicits an immediate response. The constrained multilink device knows that a response frame will be transmitted to the constrained multilink device on the 5 GHz wireless link, and therefore, to prevent IDC interference, access to the 6 GHz wireless link for transmitting data is prevented or delayed until the response frame has been received on the 5 GHz wireless link.

Figure 9:
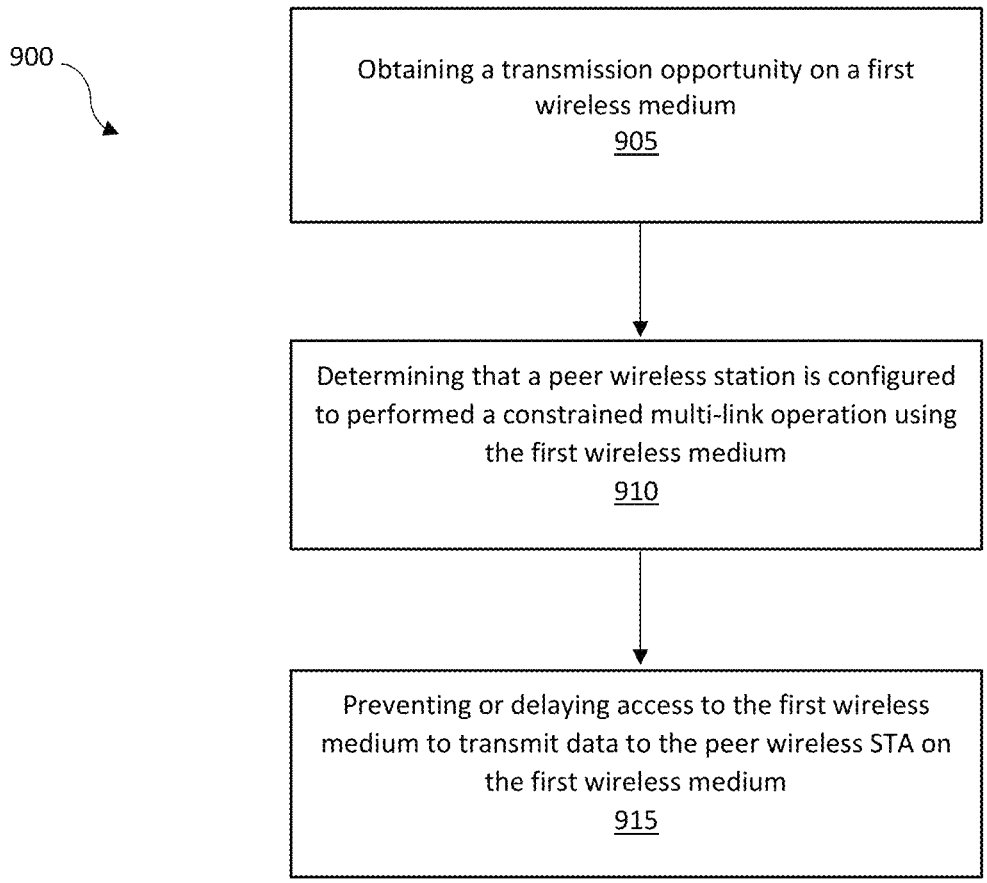
FIG. 9 is a flow chart depicting an exemplary sequence of computer implemented steps of an automatic process performed by a wireless STA to perform multi-link operations with a constrained multi-link device (peer wireless STA) during a TXOP according to embodiments of the present invention.

FIG. 9 is a flow chart depicting an exemplary sequence of computer implemented steps of a process 900 performed by a wireless STA to perform multi-link operations with a constrained multi-link device during a TXOP according to embodiments of the present invention.

At step 905, a transmission opportunity is obtained on a first wireless medium.

At step 910, it is determined that a constrained multilink device is configured to performed a constrained multi-link operation using the first wireless medium.

At step 915, access to the first wireless medium to transmit data to the constrained multilink device is prevented. Step 915 can include delaying access to the first wireless medium responsive to determining that the constrained multilink device is accessing a second wireless medium to transmit data, responsive to content of a received PPDU, or responsive to determining that a received PPDU includes an intra-BSS PPDU, for example. Step 915 can also include selectively enabling access to the first wireless medium to transmit data to the constrained multilink device on the first wireless medium according to content of a received inter-BSS PPDU, or according to a determination that a received PPDU originates from a different peer wireless STA, or conditions such as those listed in Tables 1-7 above.

In one example, at step 915, the wireless STA determines that it is receiving a PPDU on a 5 GHz link that is not being sent by the constrained multilink device. Therefore, the wireless STA no longer needs to prevent or delay access to the 6 GHz wireless channel because it knows that the constrained multilink device is not transmitting data. The wireless STA can then transmit frames on the 6 GHz to the constrained multilink device that can be received by the constrained multilink device without causing substantial IDC interference.

Exemplary Computer Controlled System

Embodiments of the present invention are drawn to electronic systems that perform multi-link operations in a wireless network. The multi-link operations can include constrained multi-link operations configured to prevent or mitigate IDC interference, for example, by preventing or delaying access to a wireless medium while data is being transmitted or received on another wireless medium. The following discussion describes one such exemplary electronic system or computer system that can be used as a platform for implementing embodiments of the present invention. The exemplary computer system 1012 can be a wireless access point or a wireless station, for example.

Figure 10:
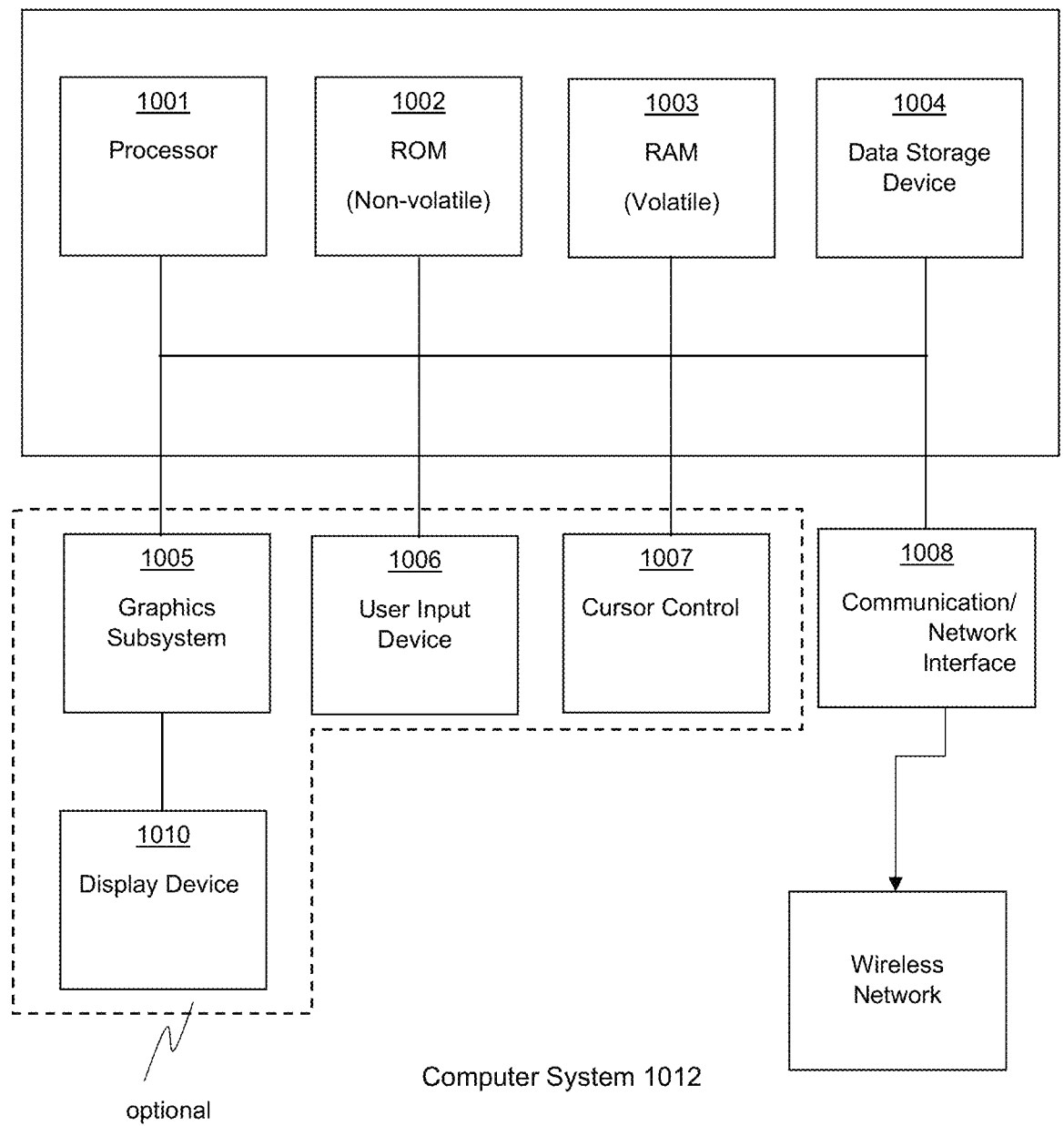
FIG. 10 is a block diagram depicting an exemplary computer system platform upon which embodiments of the present invention may be implemented.

In the example of FIG. 10, the exemplary computer system or wireless device includes a central processing unit (such as a processor or a CPU) 1001 for running software applications and optionally an operating system. Read-only memory 1002 and random access memory 1003 store applications and data for use by the CPU 1001. Data storage device 1004 provides non-volatile storage for applications and data and may include fixed disk drives, removable disk drives, flash memory devices, and CD-ROM, DVD-ROM or other optical storage devices. The optional user inputs 1006 and 1007 comprise devices that communicate inputs from one or more users to the computer system 1012 (e.g., mice, joysticks, cameras, touch screens, and/or microphones).

A communication or network interface 1008 includes a plurality of transceivers and allows the computer system 1012 to communicate with other computer systems, networks, or devices via an electronic communications network, including wired and/or wireless communication and including an Intranet or the Internet (e.g., 802.11 wireless standard). The network interface 1008 can perform multi-link operations (e.g., multi-link packet scheduling and channel access) using multiple wireless links to improve network throughput, for example. According to embodiments of the present invention, the communication or network interface 1008 can operate multiple transceivers simultaneously. The communication or network interface 1008 can include a multi-band (e.g., dual-band) interface that can operate in multiple bands simultaneously, such as 2.4 GHz, 5 GHz, and/or 6 GHz.

The optional display device 1010 may be any device capable of displaying visual information in response to a signal from the computer system 1012 and may include a flat panel touch sensitive display, for example, and may be remotely disposed. The components of the computer system 1012, including the CPU 1001, memory 1002/1003, data storage 1004, user input devices 1006, and graphics subsystem 1005 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of wireless multi-link operation performed by a multi-link device (MLD), the method comprising:
    accessing a first wireless link of the MLD to receive data using a first wireless interface of the MLD;
    receiving the data in a physical layer conformance procedure (PLCP) protocol data unit (PPDU) on the first wireless link;
    receiving a multi-user request to send (MU-RTS) frame on the first wireless link, wherein the MU-RTS frame comprises a duration field;
    determining that the MU-RTS frame is addressed to the multi-link device;
    determining an in-device coexistence (IDC) interference level of a multi-link operation; and
    denying access to transmit or receive over a second wireless link of the MLD using a second wireless interface of the MLD while receiving the PPDU on the first wireless link for a time equal to the duration field of the MU-RTS frame responsive to the determining that the MU-RTS frame is addressed to the multi-link device, wherein the denying is performed responsive to the IDC interference level being above a threshold.

2. The method as described in claim 1, wherein the first wireless link is a 5 GHz wireless link and the second wireless link is a 6 GHz wireless link.

3. The method as described in claim 1, further comprising transmitting a clear to send (CTS) frame on the first wireless link responsive to the MU-RTS frame.

4. The method as described in claim 1, further comprising transmitting a block acknowledgement (BA) on the first wireless link after the PPDU is received.

5. The method as described in claim 1, further comprising accessing the second wireless link to transmit a different PPDU using the second wireless interface of the MLD.

6. The method as described in claim 5, further comprising receiving an indication on the first wireless link that the PPDU comprises a final frame transmitted during a transmission opportunity (TXOP), wherein the accessing the second wireless link to transmit the different PPDU is performed responsive to the indication.

7. The method as described in claim 1, further comprising determining that the PPDU is scheduled to be received on the first wireless link, wherein the denying is performed responsive to the determining.

8. A method of wireless multi-link operation performed by a multi-link device (MLD), the method comprising:
   accessing a first wireless link of the MLD to transmit data using a first wireless interface of the MLD;
   transmitting a multi-user request to send (MU-RTS) frame to a peer wireless station (STA) on the first wireless link, wherein the MU-RTS frame comprises a duration field;
   transmitting the data in a physical layer conformance procedure (PLCP) protocol data unit (PPDU) for receipt by the peer wireless STA on the first wireless link using the first wireless interface of the MLD;
   determining an in-device coexistence (IDC) interference level of a multi-link operation; and
   denying access to transmit or receive over a second wireless link of the MLD using a second wireless interface of the MLD for a time equal to the duration field of the MU-RTS frame responsive to the IDC interference level being above a threshold.

9. The method as described in claim 8, wherein the PPDU solicits an immediate response, and wherein the denying comprises preventing transmission of data on the second wireless link until the immediate response has been received on the first wireless link.

10. The method as described in claim 8, wherein the determining an in-device coexistence (IDC) interference level of a multi-link operation comprises determining a frequency separation of the multi-link operation.

11. The method as described in claim 8, wherein the first wireless link is a 5 GHz wireless link and the second wireless link is a 6 GHz wireless link.

12. A method of wireless multi-link operation performed by a multi-link device (MLD), the method comprising:
   obtaining a transmission opportunity on a first wireless link of the MLD;
   determining that a peer wireless station (STA) is scheduled to perform a constrained multi-link operation using the first wireless link;
   receiving a multi-user request to send (MU-RTS) frame from the peer wireless STA on the first wireless link, wherein the MU-RTS frame comprises a duration field;
   determining an in-device coexistence (IDC) interference level of a multi-link operation; and
   denying access to the first wireless link for transmitting and receiving data over the first wireless link responsive to receiving the MU-RTS frame for a time equal to the duration field, wherein the denying is performed responsive to the IDC interference level being above a threshold.

13. The method as described in claim 12, further comprising:
   receiving a physical layer conformance procedure (PLCP) protocol data unit (PPDU) on a second wireless link; and
   determining that the PPDU is an intra-Basic Service Set (BSS) PPDU, wherein the denying is performed responsive to the determining that the PPDU is an intra-BSS PPDU.

14. The method as described in claim 12, wherein the first wireless link is a 5 GHz wireless link, the peer wireless STA is further configured to perform the constrained multi-link operation using a second wireless link, and the second wireless link is a 6 GHz wireless link.

15. The method as described in claim 12, further comprising:
   receiving an inter-Basic Service Set (BSS) physical layer conformance procedure (PLCP) protocol data unit (PPDU) on a second wireless link; and
   transmitting data to the peer wireless STA on the first wireless link responsive to content of the inter-BSS PPDU.

16. The method as described in claim 12, further comprising:
   receiving a physical layer conformance procedure (PLCP) protocol data unit (PPDU) on a second wireless link;
   determining that the PPDU originates from a second peer wireless STA, wherein the second peer wireless STA is different than the peer wireless STA; and
   transmitting data to the peer wireless STA on the first wireless link responsive to determining that the PPDU originates from the second peer wireless STA.

\* \* \* \* \*